(12) United States Patent  (10) Patent No.: US 9,046,721 B2
Hsu et al.  (45) Date of Patent: Jun. 2, 2015

(54) SUBSTRATE AND DISPLAY DEVICE HAVING THE SAME (71) Applicant: Innolux Corporation, Miao-Li County (TW)

(72) Inventors: Li-Chieh Hsu, Miao-Li County (TW); Chien-Hung Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 53 days.

(21) Appl. No.: 13/898,495

(22) Filed: May 21, 2013

(65) Prior Publication Data

US 2013/0342800 A1    Dec. 26, 2013

(30) Foreign Application Priority Data

Jun. 26, 2012  (TW) .............................. 101122790 A (51) Int. Cl.
  *G02F 1/1343*  (2006.01)
  *G02F 1/1337*  (2006.01)
  *B82Y 20/00*  (2011.01)
(52) U.S. Cl.
  CPC ......... *G02F 1/13439* (2013.01); *Y10S 977/788* (2013.01); *Y10S 977/952* (2013.01); *B82Y 20/00* (2013.01); *G02F 1/133707* (2013.01)

(58) Field of Classification Search
  USPC .......................................... 349/143, 129, 111
  See application file for complete search history.

(56) References Cited

U.S. PATENT DOCUMENTS 5,345,324 A * 9/1994 Koseki et al. ................... 349/44

OTHER PUBLICATIONS

Hsu, et al.: "Synthesis, Electrical Measurement, and Field Emission Properties of a-Fe2O3 Nanowires"; Received: Jun. 26, 20081 Accepted: Aug. 18, 2008 / Published online: Sep. 9, 2008 copyright to the authors 2008.
Hong, et al.: "Liquid crystal alignment in nanoporous anodic aluminum oxide layer for LCD panel applications"; © 2010 IOP Publishing Ltd.

\* cited by examiner

*Primary Examiner* — James Dudek
(74) *Attorney, Agent, or Firm* — McClure, Qualey & Rodack, LLP (57) ABSTRACT

A display device includes a first base substrate, a second base substrate, a liquid crystal layer, a conductive protrusion structure and an electrode structure. The second base substrate is disposed opposite to the first base substrate. The liquid crystal layer is disposed between the first and second base substrates. The conductive protrusion structure is disposed on one of the first and second base substrates. The electrode structure is at least disposed on the first or second base substrate having the conductive protrusion structure.

18 Claims, 11 Drawing Sheets

SUBSTRATE AND DISPLAY DEVICE HAVING THE SAME

This application claims the benefit of Taiwan application Serial No. 101122790, filed Jun. 26, 2012, the subject matter of which is incorporated herein by reference.

BACKGROUND

1. Field of the Invention

The invention relates in general to a substrate having a conductive protrusion structure, and more particularly to a display device having the same.

2. Description of the Related Art

Liquid crystal displays (LCDs) are prevalent as display screens of electronic products in the recent years. LCDs are available in various forms including twister nematic, super twisted nematic (STN), in-plane switching (IPS), and multi-domain vertical alignment (MVA).

When applying a voltage to electrodes of an LCD, a rotational direction of liquid crystal molecules can be controlled to modulate a polarization direction of light, such that the intensity of light passing through the liquid crystal molecules is affected to further result in a contrast between a bright state and a dark state to serve as a display image.

To control the direction of liquid crystal molecules, a conventional display based on nematic liquid crystals usually processes surface alignment of a substrate to control alignment of the liquid crystal molecules. For example, the liquid crystals proceed with a rubbing process, in which an alignment film surface applied to a surface of the substrate in contact with the liquid crystals is rubbed. However, such rubbing process not only increases production costs but also reduces the display quality. Moreover, due to a long response time, the foregoing LCD based on nematic liquid crystals is unfavorable in applications for displaying dynamic graphics in sequential colors, and a color filter film is additionally required for presenting display effects of different colors. As a result, production costs and manufacturing complications of LCDs based on nematic liquid crystals are high.

Therefore, blue phase liquid crystals having a fast response speed is one research focus of industrial developers. Blue phase LCDs offer advantages of having a fast response speed, high contrast and a wide viewing angle. Yet, blue phase liquid crystals can only be driven by a higher voltage, which is one of the issues to be overcome in developing blue phase LCD devices.

SUMMARY

The disclosure is directed to a substrate and a display device having the substrate. The substrate includes an electrode structure and a conductive protrusion structure, and is capable of increasing and extending a range of an operating electric field as well as lowering a driving voltage of the display device.

According to an aspect the disclosure, a display device is provided. The display device includes a first base substrate, a second base substrate, a liquid crystal layer, a conductive protrusion structure and an electrode structure. The second base substrate is disposed opposite to the first base substrate. The liquid crystal layer is disposed between the first and second base substrates. The conductive protrusion structure is disposed on one of the first and second base substrates. The electrode structure is disposed on at least one of the first and second base substrates having the conductive protrusion structure.

According to another aspect of the disclosure, a substrate for a liquid crystal display (LCD) device is provided. The substrate includes a base substrate, an electrode structure and a conductive protrusion structure. The conductive protrusion structure is disposed on the base substrate. The electrode structure is disposed on the base substrate, and is adjacent to a liquid crystal layer of the LCD device.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
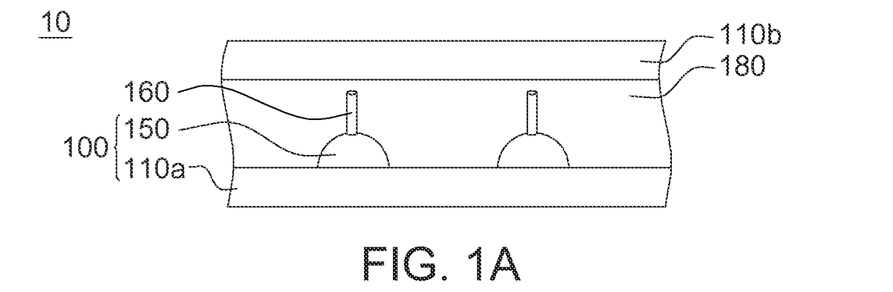
FIG. 1A is a schematic diagram of a display device according to an embodiment of the present invention.
Figure 7:
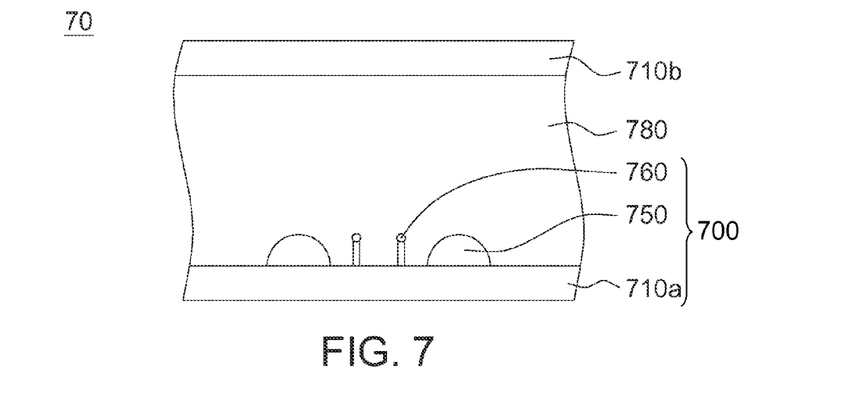
FIG. 7 is a sectional view of a display device according to an embodiment of the present invention.

FIG. 1A shows a schematic diagram of a display device according to an embodiment of the present invention. Referring to FIG. 1A, a display device 10 includes a first base substrate 110a, a second base substrate 110b, an electrode structure 150, a conductive protrusion structure 160 and a liquid crystal layer 180. The second base substrate 110b is disposed opposite to the first base substrate 110a. The electrode structure 150 is disposed on the first base substrate 110a having the conductive protrusion structure 160. For example, the electrode structure 150 includes a plurality of alternately arranged pixel electrodes and common electrodes. The conductive protrusion structure 160 is disposed on the first base substrate 110a. In one embodiment, the conductive protrusion structure 160 may be disposed between the pixel electrodes and common electrodes, or between a pixel electrode and a common electrode (as shown in FIG. 7). The liquid crystal layer 180 is disposed between the first base substrate 110a and the second base substrate 110b. The first base substrate 110a, the electrode structure 150 and the conductive protrusion structure 160 constitute a substrate 100.

In an embodiment, the conductive protrusion structure 160 includes a metal oxide or a carbon nano-material. The carbon nano-material is a group selected from carbon-based nano-material, nano carbon fiber and nano carbon graphite. For example, the conductive protrusion structure 160 may be a group selected from iron oxide, ferric oxide ($Fe_2O_3$), titanium dioxide ($TiO_2$), copper oxide (CuO) and indium tin oxide (ITO). In an embodiment, the conductive protrusion structure 160 includes a plurality of conductive protrusions having a thickness between 10 nm to 1 μm and a length between 100 nm and 10 μm. The conductive protrusions are evenly distributed in a way that the conductive protrusion structure 160 may have a density of $10^{-2}$ to $10^6$ conductive protrusions per 100 μm². When a voltage is applied to the electrode structure 150, the conductive protrusion structure 160 being affected by an electric field of the electrode structure 150, becomes electrically conductive so that a range of an operating electric field can be extended to provide an expanded effective electric field for more effectively controlling the liquid crystal molecules.

Figure 1B:
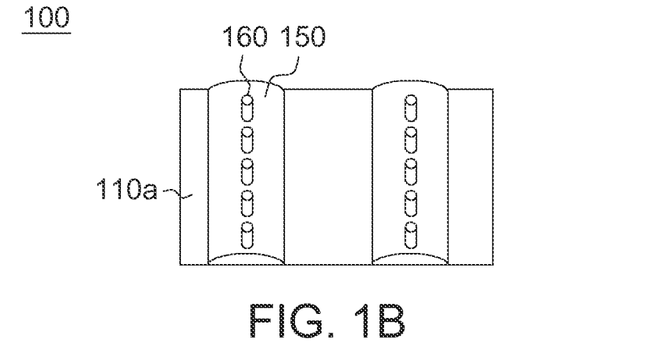
FIG. 1B is a top view of a substrate in FIG. 1A.

FIG. 1B shows a top view of the substrate 100 in FIG. 1A. In this embodiment, for example, the electrode structure 150 is a semicircular or semi-ellipsoidal cylinder. In other embodiments, the electrode structure 150 may also be a T-shaped, trapezoidal, semi-spherical, rectangular or multi-layer composite structure. For example, the conductive protrusion structure 160 includes a plurality of minute rod shaped or pin shaped conductive protrusions evenly or unevenly distributed on an axis of symmetry of the electrode structure 150 to provide point discharge. In other embodiments, the conductive protrusion structure 160 may also be a hair shaped, forked shaped, needle shaped or column shaped structure. When applying a voltage to the electrode structure 150, the conductive protrusion structure 160 is capable of extending the operating electric field and reducing a range of a dead zone. A dead zone means an insufficient electric which is too weak to drive the liquid crystal molecules. The shape and position of the conductive protrusion structure 160 may be adjusted to adapt to manufacturing or product requirements.

Figure 2:
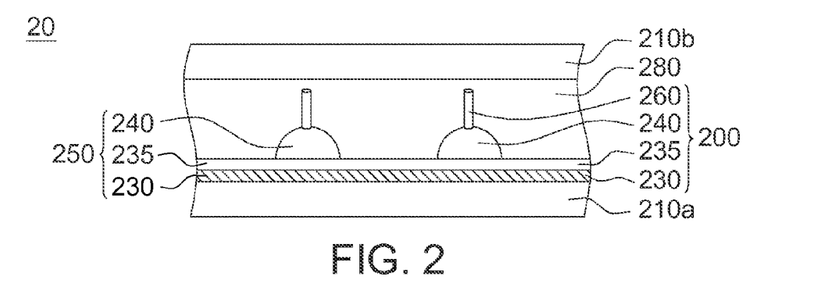
FIG. 2 is a sectional view of a display device according to an embodiment of the present invention.

FIG. 2 shows a sectional view of a display device 20 according to an embodiment of the present invention. As shown in FIG. 2, the display device 20 includes a first base substrate 210a, a second base substrate 210b, an electrode structure 250, a conductive protrusion structure 260 and a liquid crystal layer 280. The second base substrate 210b is disposed opposite to the first base substrate 210a. The electrode structure 250 includes a first electrode 230, an insulation layer 235 and a second electrode 240. The first electrode 230 is disposed on the first base substrate 210a. The insulation layer 235 is disposed on the first electrode 230. The second electrode 240 is disposed on the insulation layer 235. The conductive protrusion structure 260 is disposed on the second electrode 240. In this embodiment, for example, the length, density and material of the conductive protrusion structure 260 is substantially equal to those of the conductive protrusion structure 160 in FIGS. 1A and 1B, and associated details shall be omitted herein.

In this embodiment, the first base substrate 210a, the insulation layer 235, the electrode structure 250 and the conductive protrusion structure 260 constitute a substrate 200. In FIG. 2, the conductive protrusion structure 260 is depicted as being disposed on the axis of symmetry of the second electrode 240, and may, however, be disposed at other positions of the second electrode 240. Alternatively, the conductive protrusion structure 260 may also be disposed between two second electrodes 240 on the insulation layer 235. By applying voltages having different polarities to the two adjacent second electrodes 240, the two sides of the conductive protrusion structure 260 may carry electricity having different polarities as being induced by the second electrodes 240 to improve the intensity of the local electric field.

Figure 3:
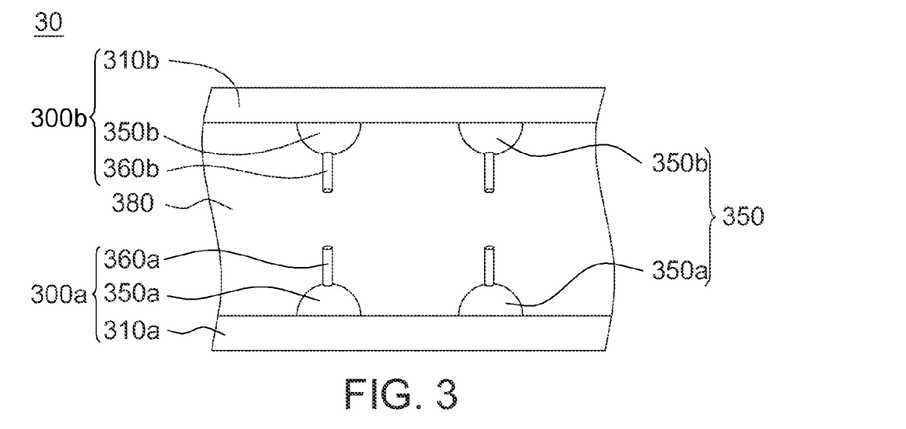
FIG. 3 is a sectional view of a display device according to an embodiment of the present invention.

FIG. 3 shows a sectional view of a display device 30 according to an embodiment of the present invention. The display device 30 includes a first base substrate 310a, a second base substrate 310b, an electrode structure 350a, an electrode structure 350b, a conductive protrusion structure 360a, a conductive protrusion structure 360b and a liquid crystal layer 380. The second base substrate 310b is disposed opposite to the first base substrate 310a. The electrode structure 350 includes the first electrode 350a and the second electrode 350b. The first electrode 350a is disposed on the first base substrate 310a, and the second electrode 350b is disposed on the second base substrate 310b. The conductive protrusion structure 360a is disposed on the second electrode 350a, and the conductive protrusion structure 360b is disposed on the second electrode 350b.

In this embodiment, the conductive protrusion structures 360a and 360b have substantially the same length, density and material as those of the conductive protrusion structure 160 in FIGS. 1A and 1B, and associated details shall be omitted herein. The first base substrate 310a, the electrode structure 350a and the conductive protrusion structure 360a constitute a substrate 300a; the second base substrate 310b, the electrode structure 350b and the conductive protrusion structure 360b constitute a substrate 300b. The substrates 300a and 300b may have similar structures and be arranged in a symmetrical manner. In other embodiments, the substrates 300a and 300b may have different structures and be arranged in a non-symmetrical manner. For example, the conductive protrusion structure may be disposed at one of the substrate, e.g., only one of the substrates 300a and 300b is disposed with the conductive protrusion structure. That is to say, the conductive protrusion structure 360a or the conductive protrusion structure 360b may be disposed on at least one of the electrode structure 350a of the substrate 300a and the electrode structure 350b of the substrate 300b.

In FIG. 3, the conductive protrusion structures 360a and 360b are depicted as respectively being disposed on the axes of symmetry of the electrode structures 350a and 350b. Given that the operating electric field of the electrode structures 350a and 350b can be extended by the conductive protrusion structures 360a and 360b, the conductive protrusion structures 360a and 360b may be disposed at other positions of the electrode structure 350a and the electrode structure 350b.

Figure 4:
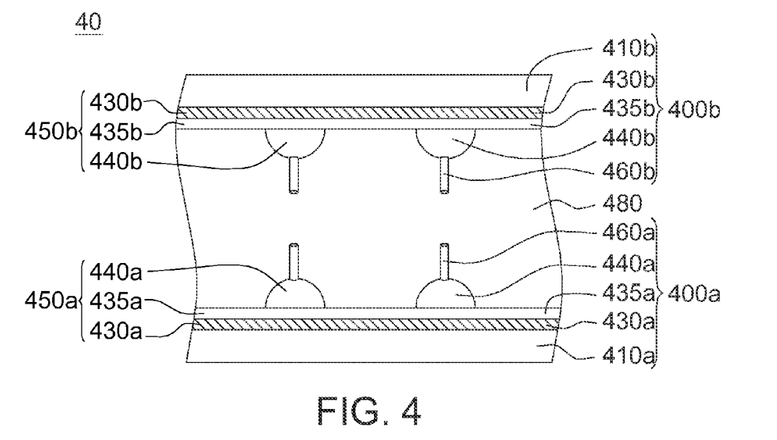
FIG. 4 is a sectional view of a display device according to an embodiment of the present invention.

FIG. 4 shows a sectional view of a display device 40 according to an embodiment of the present invention. As shown in FIG. 4, the display device 40 includes a first base substrate 410a, a second base substrate 410b, an electrode structure 450a, an electrode structure 450b, a conductive protrusion structure 460a, a conductive protrusion structure 460b and a liquid crystal layer 480. The second base substrate 410b is disposed opposite to the first base substrate 410a. The electrode 450a includes a first electrode 430a, an insulation layer 435a and a second electrode 440a. The first electrode 430a is disposed on the first base substrate 410a. The insulation layer 435a is disposed on the first electrode 430a. The second electrode 440a is disposed on the insulation layer 435a. The conductive protrusion structure 460a is disposed on the second electrode 440a. The electrode structure 450b includes a first electrode 430b, an insulation layer 435b and a second electrode 440b. The first electrode 430b is disposed on the second base substrate 410b. The insulation layer 435b is disposed on the first electrode 430b. The second electrode 440b is disposed on the insulation layer 435b. The conductive protrusion structure 460b is disposed on the second electrode 440b.

In this embodiment, the conductive protrusion structures 460a and 460b have substantially the same length, density and material as those of the conductive protrusion structure 160 in FIGS. 1A and 1B, and associated details shall be omitted herein. The first base substrate 410a, the insulation layer 435a, the electrode structure 450a and the conductive protrusion structure 460a constitute a substrate 400a. The second base substrate 410b, the insulation layer 435b, the electrode structure 450b and the conductive protrusion structure 460b constitute a substrate 400b. In FIG. 4, the conductive protrusion structures 460a and 460b are respectively disposed on the axes of symmetry of the electrode structures 450a and 450b. However, the conductive protrusion structures 460a and 460b may also be disposed at other positions of the electrode structures 450a and 450b. Alternatively, the conductive protrusion structure 460a or the conductive protrusion structure 460b may also be disposed between two electrode structures 450a on the insulation layer 435a or two electrode structures 450b on the insulation layer 435b. By applying voltages having different polarities to the two adjacent electrode structures 450a or electrode structures 450b, the two sides of the conductive protrusion structure 460a or the conductive protrusion structure 460b may carry electricity having different polarities as being induced by the electrode structures 450a or the electrode structures 450b to improve the intensity of the local electric field.

Figure 5:
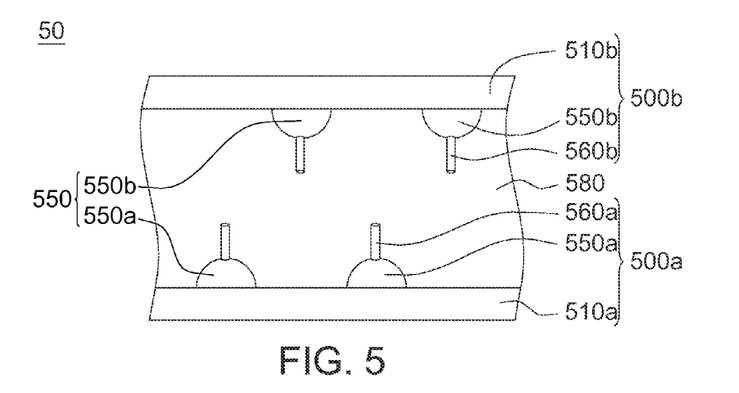
FIG. 5 is a sectional view of a display device according to an embodiment of the present invention.

FIG. 5 shows a sectional view of a display device 50 according to an embodiment of the present invention. The display device 50 includes a first base substrate 510a, a second base substrate 510b, an electrode structure 550, a conductive protrusion structure 560a, a conductive protrusion structure 560b and a liquid crystal layer 580. The first base substrate 510a is disposed opposite to the first base substrate 510a. The electrode structure 550 includes a first electrode 550a and a second electrode 550b. The first electrode 550a is disposed on the first base substrate 510a, and the second electrode 550b is disposed on the second base substrate 510. The conductive protrusion structures 560a and 560b are respectively disposed on the second electrodes 550a and 550b.

In this embodiment, the conductive protrusion structures 560a and 560b have substantially the same length, density and material as those of the conductive protrusion structure 160 in FIGS. 1A and 1B, and associated details shall be omitted herein. The first base substrate 510a, the first electrode 550a and the conductive protrusion structure 560a constitute a substrate 500a. The second base substrate 510b, the second electrode 550b and the conductive protrusion structure 560b constitute a substrate 500b.

In this embodiment, the structure of the substrate 500a and the structure of the substrate 500b may be the same or different. That is, the conductive protrusion structure may be disposed at only one of the substrate. More specifically, the conductive protrusion structure 560a or the conductive protrusion structure 560b is disposed on at least one of the first electrode 550a of the substrate 500a or the second electrode 550b of the substrate 500b. Further, the conductive protrusion structures 560a and 560b may be respectively disposed on the axes of symmetry of the electrode structures 550a and 550b. Given that the intensity of local electric field of the electrode structure 550 can be extended by the conductive protrusion structures 560a and 560b, the conductive protrusion structures 560a and 560b may be disposed at other positions of the first electrode 550a and the second electrode 550b.

Figure 6:
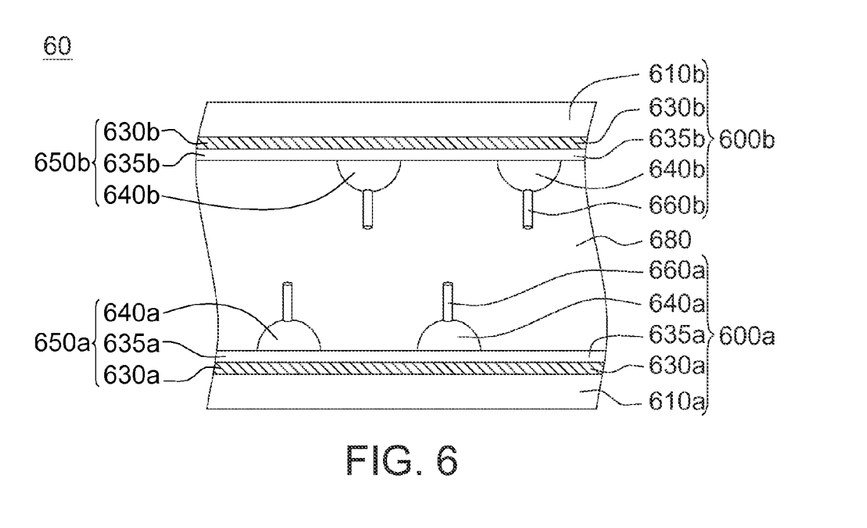
FIG. 6 is a sectional view of a display device according to an embodiment of the present invention.

FIG. 6 shows a sectional view of a display device 60 according to an embodiment of the present invention. As shown in FIG. 6, the display device 60 includes a first base substrate 610a, a second base substrate 610b, an electrode structure 650a, an electrode structure 650b, a conductive protrusion structure 660a, a conductive protrusion structure 660b and a liquid crystal layer 680. The second base substrate 610b is disposed opposite to the first base substrate 610a. The electrode structure 650a includes a first electrode 630a, an insulation layer 635a and a second electrode 640a. The first electrode 630a is disposed on the first base substrate 610a. The insulation layer 635a is disposed on the first electrode 630a. The second electrode 640a is disposed on the insulation layer 635a. The conductive protrusion structure 660a is disposed on the second electrode layer 640a. The electrode structure 650b includes a first electrode 630b, an insulation layer 635b and a second electrode 640b. The first electrode 630b is disposed on the second base substrate 610b. The insulation layer 635b is disposed on the first electrode 630b. The second electrode 640b is disposed on the insulation layer 635b. The conductive protrusion structure 660b is disposed on the second electrode 640b.

In this embodiment, the conductive protrusion structures 660a and 660b have substantially the same length, density and material as those of the conductive protrusion structure 160 in FIGS. 1A and 1B, and associated details shall be omitted herein. The first base substrate 610a, the insulation layer 635a, the electrode structure 650a and the conductive protrusion structure 660a constitute a substrate 600a. The second base substrate 610b, the insulation layer 635b, the electrode structure 650b and the conductive protrusion structure 660b constitute a substrate 600b. In FIG. 6, the conductive protrusion structures 660a and 660b are respectively disposed on the axes of symmetry of the electrode structures 650a and 650b. However, the conductive protrusion structures 660a and 660b may be disposed at other positions of the electrode structures 650a and 650b. Alternatively, the conductive protrusion structure 660a or the conductive protrusion structure 660b may also be disposed between two electrode structures 650a on the insulation layer 635a or two electrode structures 650b on the insulation layer 635b. By applying voltages having different polarities to the two adjacent electrode structures 650a or electrode structures 650b, the two sides of the conductive protrusion structure 660a or the conductive protrusion structure 660b may carry electricity having different polarities as being induced by the electrode structures 650a or the electrode structures 650b, to improve the intensity of the local electric field.

FIG. 7 shows a sectional view of a display device 70 according to an embodiment of the present invention. The display device 70 includes a first base substrate 710a, a second base substrate 710b, an electrode structure 750, a conductive protrusion structure 760 and a liquid crystal layer 780. The second base substrate 710b is disposed opposite to the first base substrate 710a. The electrode structure 750 is disposed on the first base substrate 710a having the conductive protrusion structure 760 thereon. For example, the electrode structure 750 includes a plurality of alternately arranged pixel electrodes and common electrodes. The conductive protrusion structure 760 is disposed on the first base substrate 710a and disposed between the two adjacent electrode structures 750. For example, the two adjacent electrode structures 750 are a pixel electrode and a common electrode. The liquid crystal layer 780 is disposed between the first base substrate 710a and the second base substrate 710b. The first base substrate 710a, the electrode structure 750 and the conductive protrusion structure 760 constitute a substrate 700. In this embodiment, for example, the conductive protrusion structure 760 has substantially the same length, density and material as those of the conductive protrusion structure 160 in FIGS. 1A and 1B, and associated details shall be omitted herein.

Figure 8:
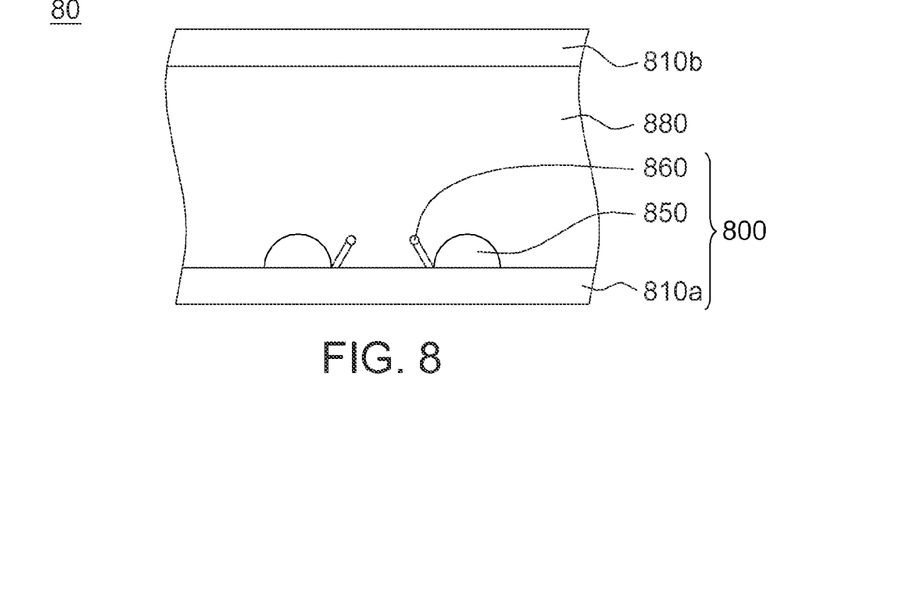
FIG. 8 is a sectional view of a display device according to an embodiment of the present invention.

FIG. 8 shows a sectional view of a display device 80 according to an embodiment of the present invention. The display device 80 includes a first base substrate 810a, a second base substrate 810b, an electrode structure 850, a conductive protrusion structure 860 and a liquid crystal layer 880. The second base structure substrate 810b is disposed opposite to the first base substrate 810a. The electrode structure 850 is disposed on the first base substrate 810a having the conductive protrusion structure 860 thereon. For example, the electrode structure 850 includes a plurality of alternately arranged pixel electrodes and common electrodes. The conductive protrusion structure 860 is disposed at an edge of the electrode structure 850. For example, the two adjacent electrode structures 850 are a pixel electrode and a common electrode. The liquid crystal layer 880 is disposed between the first base substrate 810a and the second base substrate 810b. The first base substrate 810a, the electrode structure 850 and the conductive protrusion structure 860 constitute a substrate 800. In this embodiment, for example, the conductive protrusion structure 860 has substantially the same length, density and material as those of the conductive protrusion structure 160 in FIGS. 1A and 1B, and associated details shall be omitted herein.

Figure 9:
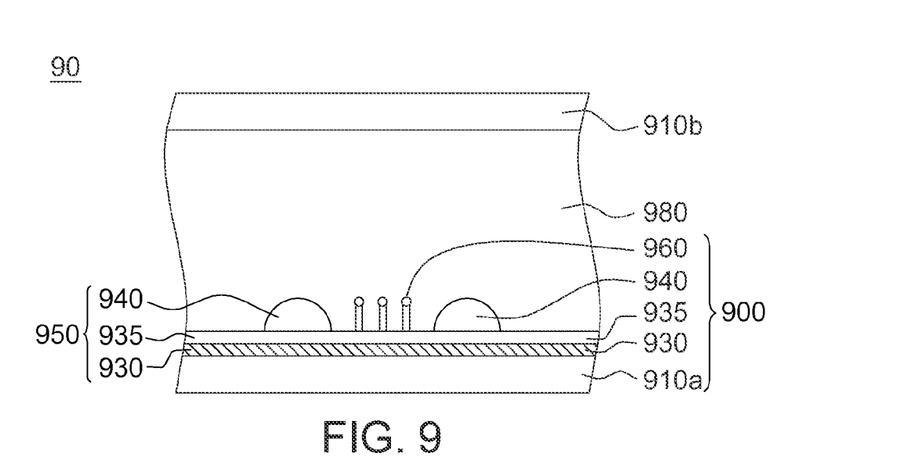
FIG. 9 is a sectional view of a display device according to an embodiment of the present invention.

FIG. 9 shows a sectional view of a display device 90 according to an embodiment of the present invention. The display device 90 includes a first base substrate 910a, a second base substrate 910b, an electrode structure 950, a conductive protrusion structure 960 and a liquid crystal layer 980. The liquid crystal layer 980 is disposed between the first base substrate 910a and the second base substrate 910b. The second base substrate 910b is disposed opposite to the first base substrate 910a. The electrode structure 950 is disposed on the first base substrate 910a having the conductive protrusion structure 960 thereon. For example, the electrode structure 950 includes a plurality of alternately arranged second electrodes 940, an insulation layer 935 and a first electrode 930. For example, the first electrode 930 and the second electrode 940 are one of pixel electrodes or common electrodes. The conductive protrusion structure 960 is disposed on a non-electrode region between two adjacent electrode structures 950, and may be disposed on a surface of the first base substrate 910a. For example, two adjacent electrode structures 950 may be a pixel electrode and a common electrode.

The first base substrate 910a, the electrode structure 950 and the conductive protrusion structure 960 constitute a substrate 900. In this embodiment, for example, the conductive protrusion structure 960 has substantially the same length, density and material as those of the conductive protrusion structure 160 in FIGS. 1A and 1B, and associated details shall be omitted herein. By applying voltages having different polarities to the two adjacent electrode structures 950, the two sides of the conductive protrusion structure 960 may carry electricity having different polarities as being induced by the electrode structures 950, to improve the intensity of the local electric field.

Figure 10A:
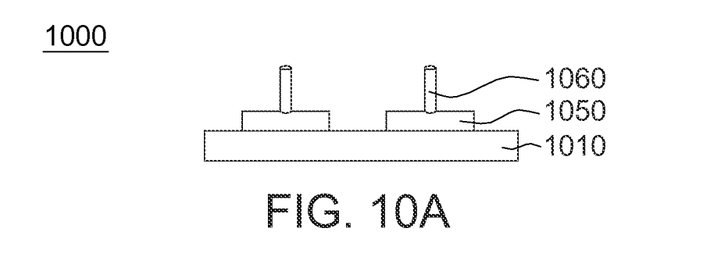
FIGS. 10A and 10B are schematic diagrams of a substrate according to an embodiment of the present invention.
Figure 10B:
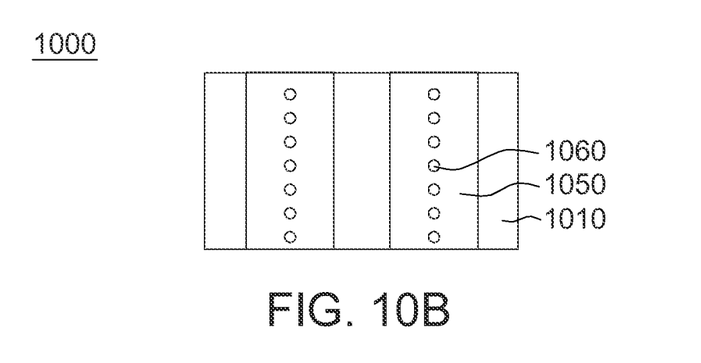

FIG. 10A shows a sectional view of a substrate 1000 according to an embodiment of the present invention. As shown in FIG. 10A, the substrate 1000 includes a base substrate 1010, electrode structures 1050 and conductive protrusion structures 1060. FIG. 10B shows a top view of the substrate 1000 in FIG. 10A. The substrate 1000 is similar to the substrate 100 in FIG. 1A, with a main difference being that the electrode structures 1050 of the substrate 1000 are rectangular bodies. The substrate 1000 may replace the substrates at either side of the display devices 10 to 90 in FIGS. 1A, 1B, 2 to 9.

Figure 11A:
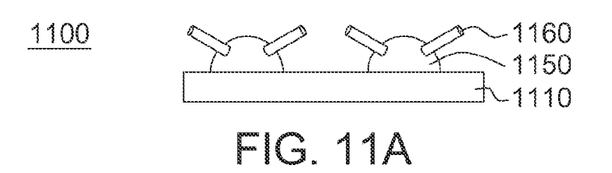
FIGS. 11A and 11B are schematic diagrams of a substrate according to an embodiment of the present invention.
Figure 11B:
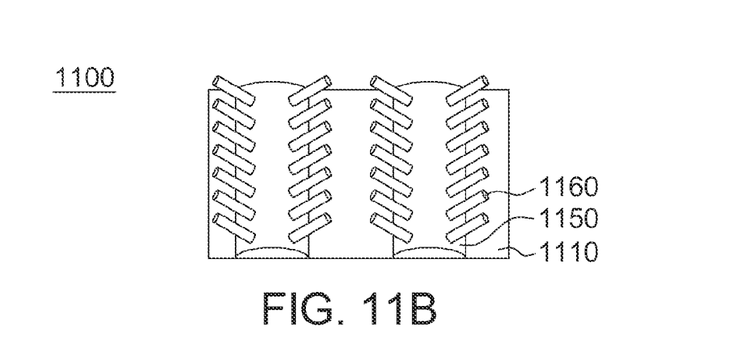

FIG. 11A shows a sectional view of a substrate 1100 according to an embodiment of the present invention. As shown in FIG. 11A, the substrate 1100 includes a base substrate 1110, electrode structures 1150 and conductive protrusion structures 1160. FIG. 11B shows a top view of the substrate 1100 in FIG. 11A. The substrate 1100 is similar to the substrate 100 in FIG. 1A, with a main difference being that conductive protrusion structures 1160 of the substrate 1100 are disposed at two sides of the electrode structure 1150. Thus, an issue of a dead zone of an electric field after applying a voltage can be solved. The conductive protrusion structures 1160 may be evenly or unevenly distributed, and may be arranged in a symmetrical or unsymmetrical manner at two sides of the electrode structures 1150 to adapt to manufacturing or product requirements. The substrate 1100 may substitute for the substrate at either side of the display device 10, 20, 30, 40, 50, 60, 70, 80 or 90 in FIGS. 1A, 1B, 2 to 9, respectively.

Figure 12A:
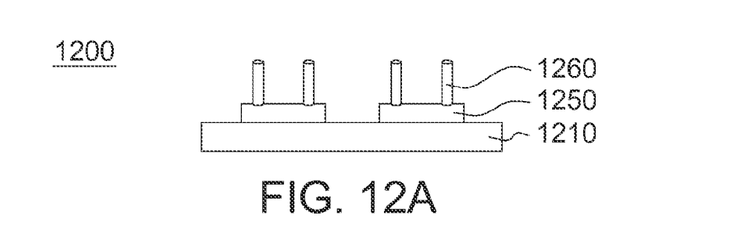
FIGS. 12A and 12B are schematic diagrams of a substrate according to an embodiment of the present invention.
Figure 12B:
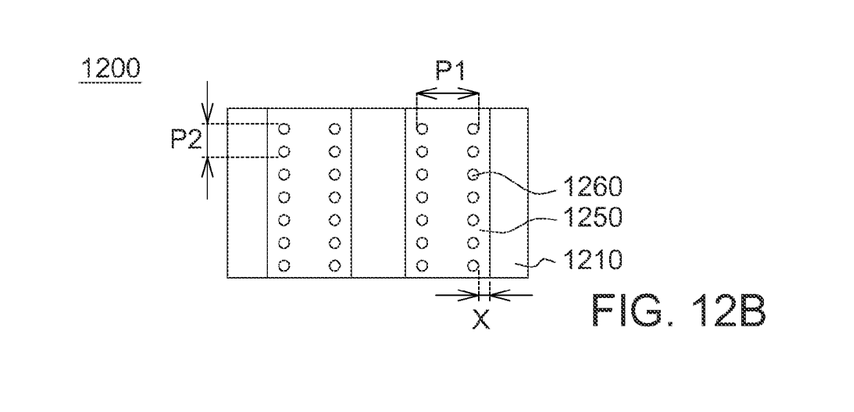

FIG. 12A shows a sectional view of a substrate 1200 according to an embodiment of the present invention. As shown in FIG. 12A, the substrate 1200 includes a base substrate 1210, electrode structures 1250 and conductive protrusion structures 1260. FIG. 12B shows a top view of the substrate 1200 in FIG. 12A. The substrate 1200 is similar to the substrate 1000 in FIG. 10A, with a main difference being that the conductive protrusion structures 1260 of the substrate 1200 are disposed at two sides of the electrode structures 1250 to solve an issue of a dead zone of an electric field after applying a voltage.

In this embodiment, a distance X is between the conductive protrusion structure 1260 and an edge of the electrode structure 1250, and the distance X ranges between 10 nm and 10 μm. A gap P1 is between two rows of conductive protrusion structures 1260, and the gap P1 ranges between 0.01 μm and 20 μm. A gap P2 is between every two conductive protrusion structures 1260 of the same row, and the gap P2 ranges between 0.01 μm and 20 μm. In an embodiment, the conductive protrusion structures 1260 may be evenly or unevenly distributed, and the conductive protrusion structures 1260 may be arranged in a symmetrical or unsymmetrical manner at two sides of the electrode structure 1250 to adapt to manufacturing or product requirements. The substrate 1200 may substitute for the substrate at either side of the display device 10, 20, 30, 40, 50, 60, 70, 80 or 90 in FIGS. 1A, 1B, 2 to 9, respectively.

Figure 13:
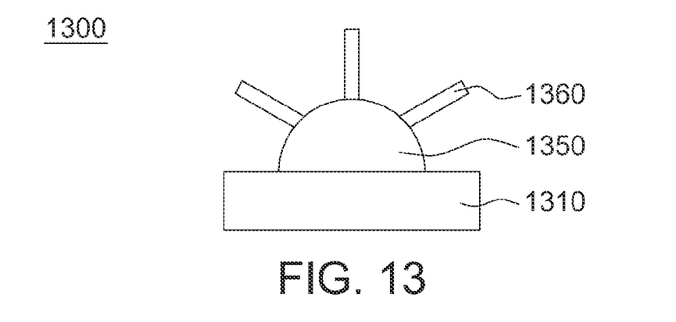
FIGS. 13 to 19 are schematic diagrams of an electrode structure and conductive protrusion structures according to different embodiments of the present invention.

FIGS. 13 to 19 show schematic diagrams of an electrode structure and conductive protrusion structures according to different embodiments of the present invention. Referring to FIG. 13, for example, a cross-section of the electrode structure 1350 is semi-circle shaped, and a plurality of conductive protrusion structures 1360 may be disposed on a surface of the electrode structure 1350. In this embodiment, three rows of conductive protrusion structures 1360 disposed on the electrode structure 1350 are taken as an example. In other embodiments, more or fewer rows of conductive protrusion structures 1360 may be arranged on the electrode structure 1350 in an uneven and unsymmetrical manner to adapt to manufacturing and product requirements.

Figure 14:
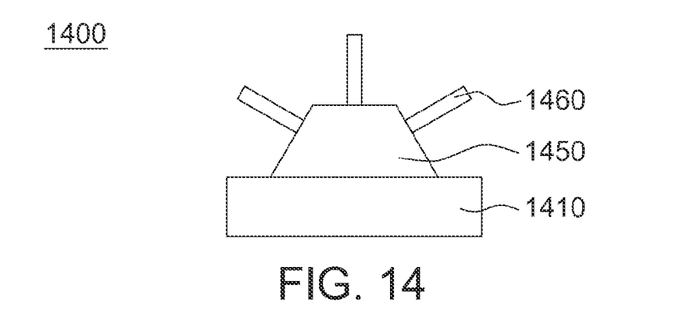
Figure 15:
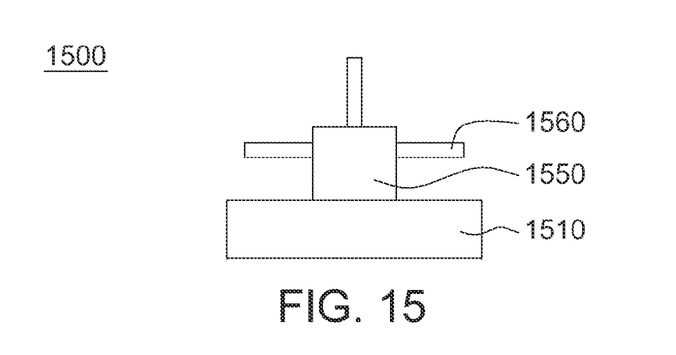
Figure 16:
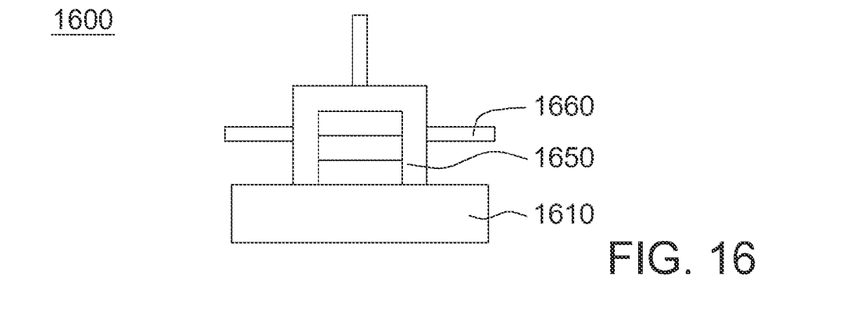

Referring to FIG. 14, in an embodiment, a cross-section of an electrode structure 1450 may be a trapezoid, and a plurality of conductive protrusion structures 1460 may be disposed on a surface of the electrode structure 1450. Referring to FIG. 15, in an embodiment, a cross-section of an electrode structure 1550 may be rectangle or square shaped, and a plurality of conductive protrusion structures 1560 may be disposed on a surface of the electrode structure 1550. Referring to FIG. 16, in an embodiment, a cross-section of an electrode structure 1650 may be a layer-stacked structure, and a plurality of conductive protrusion structures 1660 may be disposed on a surface of the electrode structure 1650. In FIGS. 14 to 16, the electrode structures 1450 to 1650 evenly arranged with three rows of conductive protrusion structures 1460 to 1660 are taken as examples. In other embodiments, more or fewer rows of conductive protrusion structures 1460 to 1660 may be arranged in an uneven and unsymmetrical manner on the electrode structures 1450 to 1640 electrode structures to adapt to manufacturing and product requirements.

Figure 17:
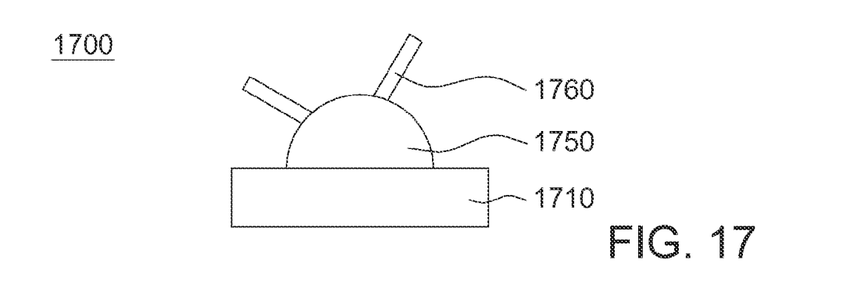
Figure 18:
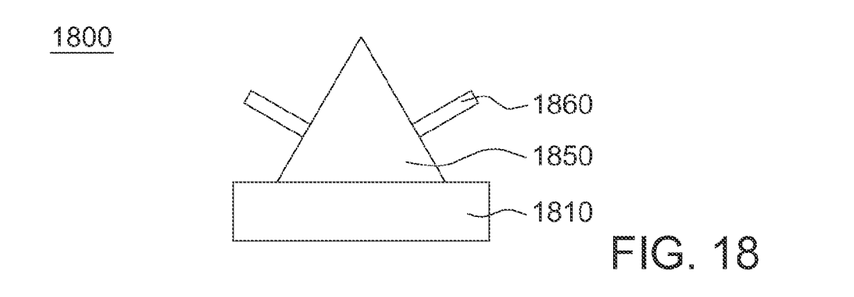

Referring to FIG. 17, in an embodiment, a cross-section of an electrode structure 1750 may be a layer-stacked structure (not shown), and a plurality of conductive protrusion structures 1760 may be provided on a surface of the electrode structure 1750. Referring to FIG. 18, in an embodiment, a cross-section of an electrode structure 1850 may be triangular shaped, and a plurality of conductive protrusion structures 1860 may be disposed on a surface of the electrode structure 1850. In FIGS. 17 and 18, the electrode structures 1750 and 1850 with two rows of conductive protrusion structures 1760 and 1860 arranged in an unsymmetrical or symmetrical manner are taken as examples. In other embodiments, more or fewer rows of conductive protrusion structures 1760 and 1860 may be evenly or unevenly arranged in a symmetrical manner on the electrode structures 1750 and 1850 to adapt to manufacturing and product requirements.

Figure 19:
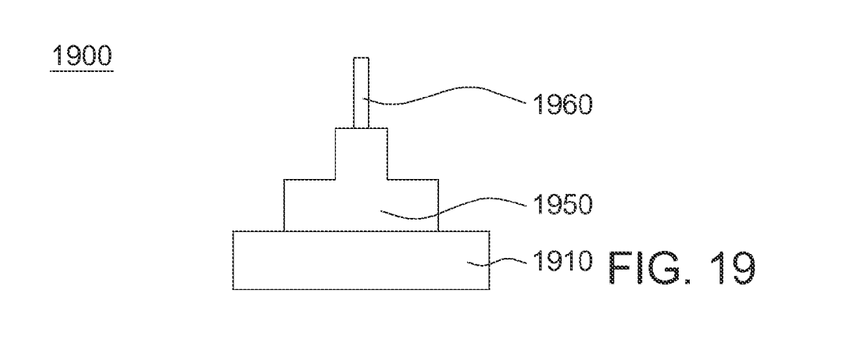

In an embodiment, a cross-section of an electrode structure 1950 may be T-shaped, and a plurality of conductive protrusion structures 1960 may be disposed on a surface of the electrode structure 1950. In FIG. 19, the electrode structure 1960 with a single row of conductive protrusion structures 1960 is taken as an example. In other embodiments, more or fewer rows of conductive protrusion structures 1960 may be evenly or unevenly arranged in a symmetrical manner on the electrode structure 1950 to adapt to manufacturing and product requirements.

Figure 20A:
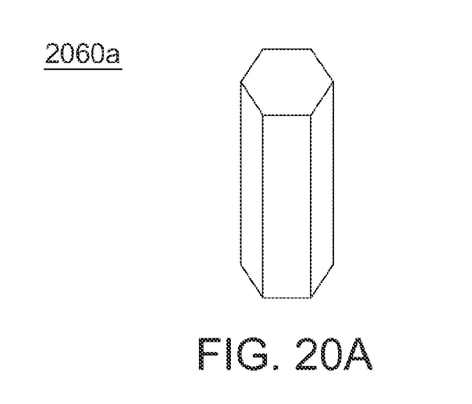
FIGS. 20A to 20E are schematic diagrams of a conductive protrusion structure according to different embodiments of the present invention.
Figure 20B:
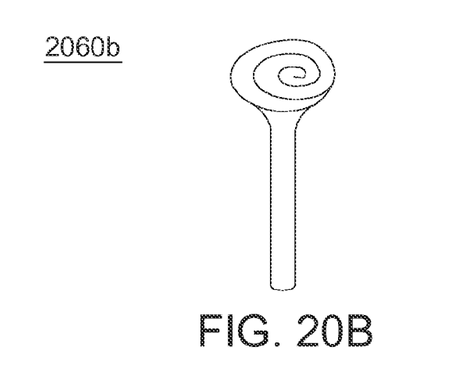
Figure 20C:
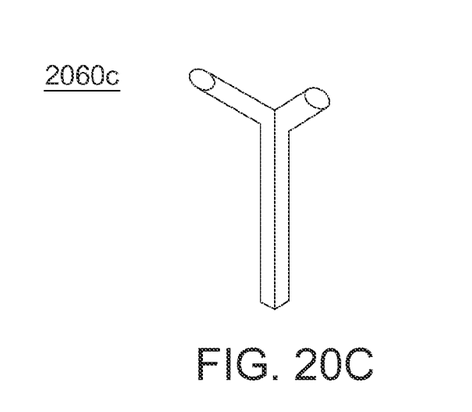
Figure 20D:
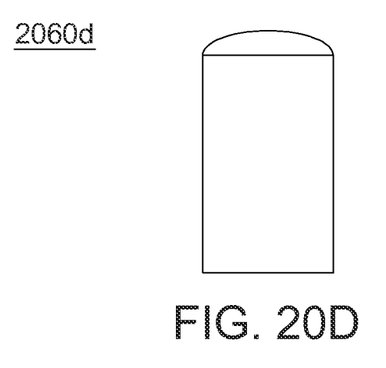
Figure 20E:
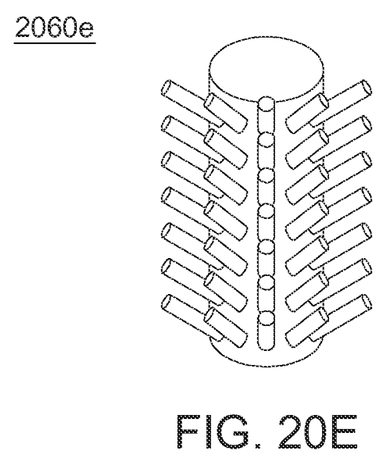

FIGS. 20A to 20E show schematic diagrams of a conductive protrusion structure according to different embodiments of the present invention. Referring to FIG. 20A, a conductive protrusion structure 2060a may be polygonal cylinder shaped, e.g., hexagonal cylinder shaped in FIG. 20A. Referring to FIG. 20B, a conductive protrusion structure 2060b may be a rod shaped structure having a spiral top end. Referring to FIG. 20C, a conductive protrusion structure 2060c may be a forked shape. Referring to FIG. 20D, a conductive protrusion structure 2060d may be a semicircular cylinder. Referring to FIG. 20E, a conductive protrusion structure 2060e may be column shaped (e.g., a carbon column) having a plurality of outwardly extending minute branches (e.g., zinc oxide). In an embodiment, the conductive protrusion structure may be a hair shaped or a pin shaped structure.

In summary, a substrate and a display device having such substrate are provided as described by the above embodiments of the present invention. Through arrangements of electrode structures and conductive protrusion structures, a part of an electric field is effectively reinforced to lower a driving voltage of the display device. An issue of a dead zone of an electric field is further mitigated by disposing the conductive protrusion structures on a surface of the electrode structures. Thus, without additionally increasing the driving voltage, a more uniform electric field having greater intensity and a higher density is provided to thus expand and extend a range of an operating electric field as well as to lower the driving voltage.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
   a first base substrate;
   a second base substrate;
   a liquid crystal layer, disposed between the first base substrate and the second base substrate;
   an electrode structure, disposed on at least one of the first base substrate and the second base substrate; and
   a conductive protrusion structure, disposed on at least one of the first base substrate, the second base substrate and the electrode structure, wherein the conductive protrusion structure comprises a plurality of conductive protrusions in a predetermined arrangement, a first gap between two adjacent rows of the conductive protrusions ranges between 0.01 µm and 20 µm, a second gap between the conductive protrusions of a same row ranges between 0.01 µm and 20 µm, and a density of the conductive protrusions is $10^{-2}$ to $10^6$ conductive protrusions per 100 µm$^2$.

2. The display device according to claim 1, wherein the electrode structure comprises:
   a first electrode, disposed on the first base substrate; and
   a second electrode, disposed on the second base substrate;
   wherein the conductive protrusion structure is disposed on at least one of the first electrode and the second electrode.

3. The display device according to claim 1, wherein the electrode structure comprises:
   a first electrode, disposed on the first base substrate;
   an insulation layer, disposed on the first electrode; and
   a second electrode, disposed on the insulation layer; and
   the conductive protrusion structure is disposed on the insulation layer or the second electrode.

4. The display device according to claim 1, wherein the electrode structure comprises:
   a pixel electrode, disposed on at least one of the first base substrate and the second base substrate; and
   a common electrode, spaced from the pixel electrode and alternately disposed with the pixel electrode; and
   the conductive protrusion structure is disposed between the pixel electrode and the common electrode, or is disposed on at least one of the pixel electrode and the common electrode.

5. The display device according to claim 1, wherein the electrode structure comprises a T-shaped, a trapezoidal shaped, a semicircular shaped, a rectangular shaped or a multi-layer composite structure; and the conductive protrusion structure comprises a metal oxide or a carbon nano-material, and carbon nano-material is a group selected from carbon-based nanomaterial, nano carbon fiber and nano carbon graphite.

6. The display device according to claim 5, wherein the conductive protrusion structure is a group selected from ferric oxide, titanium dioxide, copper oxide and indium tin oxide.

7. The display device according to claim 1, wherein the conductive protrusion structure has a thickness ranging between 10 nm and 1 μm, and the conductive protrusion structure has a length ranging between 100 nm and 10 μm.

8. The display device according to claim 1, wherein the conductive protrusion structure is a hair shaped, forked shaped, pin shaped or column shaped structure, and the column shaped conductive protrusion structure comprises a carbon column and a plurality of fiber shaped branches disposed on the carbon column.

9. The display device according to claim 1, wherein the conductive protrusion structure is disposed at an edge of the electrode structure or at an axis of symmetry of the electrode structure, and a distance between the conductive protrusion structure and the edge of the electrode structure ranges between 10 nm and 10 μm.

10. The display device according to claim 1, wherein the first base substrate comprises an electrode region and a non-electrode region, the electrode structure is disposed at the electrode region, and the conductive protrusion structure is disposed between the non-electrode region and the electrode region or on the non-electrode region.

11. A substrate, applied to a liquid crystal display (LCD) device, comprising:
    a base substrate;
    an electrode structure, disposed on the base substrate and adjacent to a liquid crystal layer of the LCD device; and
    a conductive protrusion structure, disposed on at least one of the base substrate and the electrode structure, wherein the conductive protrusion structure comprises a plurality of conductive protrusions in a predetermined arrangement, a first gap between two adjacent rows of the conductive protrusions ranges between 0.01 μm and 20 μm, a second gap between the conductive protrusions of a same row ranges between 0.01 μm and 20 μm, and a density of the conductive protrusions is $10^{-2}$ to $10^6$ conductive protrusions per 100 μm².

12. The substrate according to claim 11, wherein the conductive protrusion structure is disposed at an edge of the electrode structure or at an axis of symmetry of the electrode structure, and a distance between the conductive protrusion structure and the edge of the electrode structure ranges between 10 nm and 10 μm.

13. The substrate according to claim 11, wherein the electrode structure comprises:
    a first electrode, disposed on the base substrate;
    an insulation layer, disposed on the first electrode; and
    a second electrode, disposed on the insulation layer, and the conductive protrusion structure is disposed on the insulation layer or the second electrode.

14. The substrate according to claim 11, wherein the electrode structure comprises:
    a pixel electrode, disposed on the base substrate; and
    a common electrode, spaced from the pixel electrode and alternately disposed with the pixel electrode; and
    the conductive protrusion structure is disposed between the pixel electrode and the common electrode, or is disposed on at least one of the pixel electrode and the common electrode.

15. The substrate according to claim 11, wherein the electrode comprises a T-shaped, a trapezoidal shaped, a semicircular shaped, a rectangular shaped or a multi-layer composite structure, the conductive protrusion structure is a hair shaped, forked shaped, pin shaped or column shaped structure, and the column shaped conductive protrusion structure comprises a carbon column and a plurality of fiber shaped branches disposed on the carbon column.

16. The substrate according to claim 15, wherein the conductive protrusion structure comprises a metal oxide or a carbon nano-material, and the carbon nano-material is a group selected from carbon-based nanomaterial, nano carbon fiber and nano carbon graphite.

17. The substrate according to claim 11, wherein conductive protrusion structure has a thickness ranging between 10 nm and 1 μm and a length ranging between 100 nm and 10 μm.

18. The substrate according to claim 11, wherein the substrate comprises an electrode region and a non-electrode region, the electrode structure is disposed at the electrode region, and the conductive protrusion structure is disposed between the non-electrode region and the electrode region or on the non-electrode region.

\* \* \* \* \*